United States Patent
Angadi et al.

(10) Patent No.: US 11,567,902 B2
(45) Date of Patent: *Jan. 31, 2023

(54) SYSTEMS AND METHODS FOR DOCUMENT SEARCH AND AGGREGATION WITH REDUCED BANDWIDTH AND STORAGE DEMAND

(71) Applicant: Exterro, Inc., Beaverton, OR (US)

(72) Inventors: Shashidhar Angadi, Beaverton, OR (US); Bobby Balachandran, Beaverton, OR (US); Ajith Samuel, Beaverton, OR (US); Karthik Palani, Beaverton, OR (US); Kavitha Thangasami, Coimbatore (IN); Jordan Drake, Beaverton, OR (US); Lawrence Antony, Coimbatore (IN); Arun Sivakumar, Coimbatore (IN)

(73) Assignee: Exterro, Inc., Beaverton, OR (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/081,831

(22) Filed: Oct. 27, 2020

(65) Prior Publication Data
US 2021/0109899 A1    Apr. 15, 2021

Related U.S. Application Data

(63) Continuation of application No. 15/787,620, filed on Oct. 18, 2017, now Pat. No. 10,872,061.

(60) Provisional application No. 62/431,701, filed on Dec. 8, 2016.

(51) Int. Cl.
*G06F 16/174* (2019.01)
*G06F 16/13* (2019.01)
*G06F 16/93* (2019.01)
*G06F 16/14* (2019.01)
*G06F 16/16* (2019.01)
*G06F 16/00* (2019.01)

(52) U.S. Cl.
CPC ......... *G06F 16/1748* (2019.01); *G06F 16/00* (2019.01); *G06F 16/13* (2019.01); *G06F 16/148* (2019.01); *G06F 16/162* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 8,694,469 B2* | 4/2014 | Parab | ................. | G06F 11/1464 707/661 |
| 9,189,421 B2* | 11/2015 | Testardi | ............. | G06F 11/1464 |
| 9,852,149 B1* | 12/2017 | Taylor | ................. | G06F 16/1844 |
| 10,635,645 B1* | 4/2020 | Abushwashi | ....... | G06F 16/2358 |
| 10,747,436 B2* | 8/2020 | Kochunni | ............ | G06F 3/0605 |
| 10,747,630 B2* | 8/2020 | Sanakkayala | ......... | G06F 11/301 |
| 10,747,726 B2* | 8/2020 | Harnik | .................... | G06F 9/452 |

(Continued)

*Primary Examiner* — Kim T Nguyen
(74) *Attorney, Agent, or Firm* — McCoy Russell LLP

(57) ABSTRACT

Methods and systems comprising a gateway coordinator of a local system that receives a task comprising search criteria, crawls for files on a local data source of the local system, and encounters one or more files of interest. The one or more files of interest may be deNISTed and deduplicated and sent to an upload coordinator of a remote cloud facility. In one or more examples, the gateway coordinator may be a virtual machine.

18 Claims, 4 Drawing Sheets

(56) References Cited

U.S. PATENT DOCUMENTS

| | | | |
|---|---|---|---|
| 10,754,734 B2* | 8/2020 | Kripalani | G06F 8/61 |
| 10,754,827 B2 | 8/2020 | Kaplan et al. | |
| 10,754,837 B2* | 8/2020 | Mishra | G06F 16/182 |
| 10,867,040 B2* | 12/2020 | Gibbons, Jr. | G06F 21/552 |
| 10,872,061 B2* | 12/2020 | Angadi | G06F 16/1748 |
| 2014/0006355 A1* | 1/2014 | Kirihata | G06F 9/45533 |
| | | | 707/654 |
| 2016/0154864 A1* | 6/2016 | Mangan, III | G06F 16/2228 |
| | | | 707/722 |
| 2017/0344900 A1* | 11/2017 | Alzahrani | G06F 16/48 |
| 2018/0107824 A1* | 4/2018 | Gibbons, Jr. | G06F 21/565 |
| 2018/0165295 A1* | 6/2018 | Angadi | G06F 16/162 |
| 2022/0029965 A1* | 1/2022 | Chanak | H04L 63/029 |

* cited by examiner

SYSTEMS AND METHODS FOR DOCUMENT SEARCH AND AGGREGATION WITH REDUCED BANDWIDTH AND STORAGE DEMAND

CROSS REFERENCE TO RELATED APPLICATIONS

The present application is a continuation of U.S. Non-Provisional patent application Ser. No. 15/787,620, entitled, "SYSTEMS AND METHODS FOR DOCUMENT SEARCH AND AGGREGATION WITH REDUCED BANDWIDTH AND STORAGE DEMAND", and filed on Oct. 18, 2017, which claims priority to U.S. Provisional Application No. 62/431,701, entitled "SYSTEMS AND METHODS FOR DOCUMENT SEARCH AND AGGREGATION WITH REDUCED BANDWIDTH AND STORAGE DEMAND," filed Dec. 8, 2016. The entire contents of U.S. Non-Provisional patent application Ser. No. 15/787,620 and U.S. Provisional Application No. 62/431,701 are hereby incorporated by reference in their entirety for all purposes.

BACKGROUND AND SUMMARY

Searching and aggregation is common practice when a content repository or email system contains multiple files of interest to a particular task which may be distributed throughout the content repository. While document search and aggregation may often be accomplished by conventional methods when the content repository of interest is small, the computational costs grow as the content repository, and the number of relevant files, grows. The complexity rises as companies move away from the traditional installation of the software behind a firewall to cloud-based systems. Conventional file search and aggregation methods may become prohibitively expensive as content repositories become very large, or in cases where document search and aggregation is performed across multiple content repositories, e.g. in a large organization with many individual computers, servers, or other data sources. A constraint in document aggregation for cloud based systems is the bandwidth bottleneck—the searched and aggregated documents of interest must often be copied or transferred to other (local or non-local) machines or storage facilities (e.g. cloud storage) in order to be of use. However, the massive amounts of data which may be generated by a native search and aggregation routine can result in excessive bandwidth charges, or may result in slowed transfer rates for other network users while the file transfer is being performed. These considerations are especially relevant where the size of the content repositories/networks are very large, where the number of potentially relevant documents is very large, and where there is likely to be a high amount of redundancy in the documents searched.

TECHNICAL FIELD

One particular application of document search and aggregation methods is in e-discovery. During or in anticipation of a litigation, parties to a litigation may be required to preserve and eventually produce documents in their possession that relate to the litigation. Documents to be preserved may be subject to a legal hold. Documents may exist in electronic form in computer systems or electronic storage devices. One element of e-discovery involves obtaining a thorough set of relevant documents from computer systems and electronic storage devices belonging to one or more interested parties. When there are a large number of documents contained in the computer systems, a manual discovery process can be very cumbersome and a conventional document dump may be prohibitively expensive in terms of computational costs. Further, although compliance with a legal hold requires a thorough search of the computer systems and electronic storage devices, for reasons of cost management, privacy, and confidentiality, parties want to avoid producing documents that are not relevant to the litigation.

To reduce the expense of e-discovery, computer software may be used to automatically search for and retrieve relevant documents. Typically, the software will search for emails or documents containing the keywords or names provided by users or individuals related to the litigation. The names and keywords used in the search may be identified by operators of the e-discovery system, which may be the parties managing a case. However, conventional e-discovery software may be run remotely form the data source of interest. Thus, when retrieving documents from the electronic storage facilities at the organization of interest, the data must be aggregated before it is known whether the documents are relevant, how much redundancy is in the data, and so forth. This can result in very large quantities of data which must be transferred, such that bandwidth demands may be prohibitively large if transferring the files via Internet; further, this approach may require manual intervention. In cases where the amount of data generated is extremely large (e.g. many terabytes or more), it may be necessary to download the data to physical media and to physically move the copied data from one place to another. This may result in security risks and potential breaks in the data's chain of custody (discussed below). Therefore, not only are there technical challenges in efficiently and accurately transferring and updating remote data storage, but there are also technical problems in actually achieving and maintaining accurate change of custody information that is verifiable in a practical way. Thus, the inventors herein have recognized that there may be a need for systems and methods that address these and other technological challenges in the context of document searching and aggregation.

In one instance, the above technical problems may be addressed by a method comprising deduplicating files on a local network; deNISTing files on the local network; and sending the deduplicated and deNISTed files to a cloud facility for storage. The method may check the deduplicated and deNISTed files for one or more search terms or queries specified by an operator. Sending the deduplicated and deNISTed files may include only sending files which include the one or more terms and/or queries. The method may also include updating a chain of custody corresponding to each of the deduplicated and deNISTed files, and sending the chain of custody to the cloud facility for storage; sending metadata corresponding to each of the deduplicated and deNISTed files, and sending the metadata to the cloud facility for storage; determining metrics data corresponding to the deduplicated and deNISTed files, and sending the metrics data to the cloud facility for storage; and encrypting and compressing the documents prior to the sending. Sending the documents to the cloud facility for storage may include sending the documents via a secure HTTPS port. The deduplicating, deNISTing, and culling may be performed at the local network, remote from the cloud facility.

In another embodiment, the above objects may be accomplished by a method, comprising issuing a task command to a remote network, the task command including one or more search keywords; receiving a plurality of files from the remote network, the files containing the one or more search keywords; storing the plurality of files in one or more content repositories; wherein the plurality of files are culled and deduplicated at the remote network. In still another example, the above objects may be accomplished by a system, comprising, a local network, including a local filesystem and a local processing device; a cloud service, including a cloud filesystem and a cloud processing device; a communicative coupling between the local network and the cloud service; wherein the local filesystem includes computer-readable instructions stored in non-transitory memory for: in response to a search request comprising a keyword, reducing a bandwidth demand on the communicative coupling by searching in the local filesystem for documents which contain the keyword, culling and deduplicating the documents, deNISTing the documents, and sending the deduplicated, deNISTed documents which contain the keyword to the cloud service via the communicative coupling.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Electronic files may correspond to various file types, including but not limited to an email, text message, distribution list, spreadsheet, text file, bit map, or graphics file. Electronic documents, as referred to herein, may be accessible by known electronic communications methods and may be stored in a variety of data sources, including but not limited to custodian hard disk drives (HDD) or other types of storage devices, email servers, network shares, etc.

A target corpus of documents (e.g. electronic files) to be searched may be identified. In some cases, it may be necessary to search through a large number of documents in a large storage area to find a few documents containing relevant information. The storage area to be searched may be identified by physical storage devices, logical storage partitions, document security designations, or by any other means known to one of ordinary skill in the art. A large search scope increases the potential for finding relevant documents but may require a prohibitively large search time and expense. The entire corpus of documents may be searched for documents that are relevant to a litigation, for example, and a manual review of every document in the corpus could be a long and laborious process. Thus, effectively filtering or culling the corpus may reduce the quantity of documents that need to be reviewed. Documents not meeting the search criteria may not be reviewed. In the embodiments discussed below, the corpus of documents may be contained within a single computer or storage device, or the corpus of documents may be spread across multiple servers, client computers, storage devices and other components that may or may not be interconnected. For example, the corpus of documents may be stored in a hosted user environment utilizing distributed storage.

Figure 1:
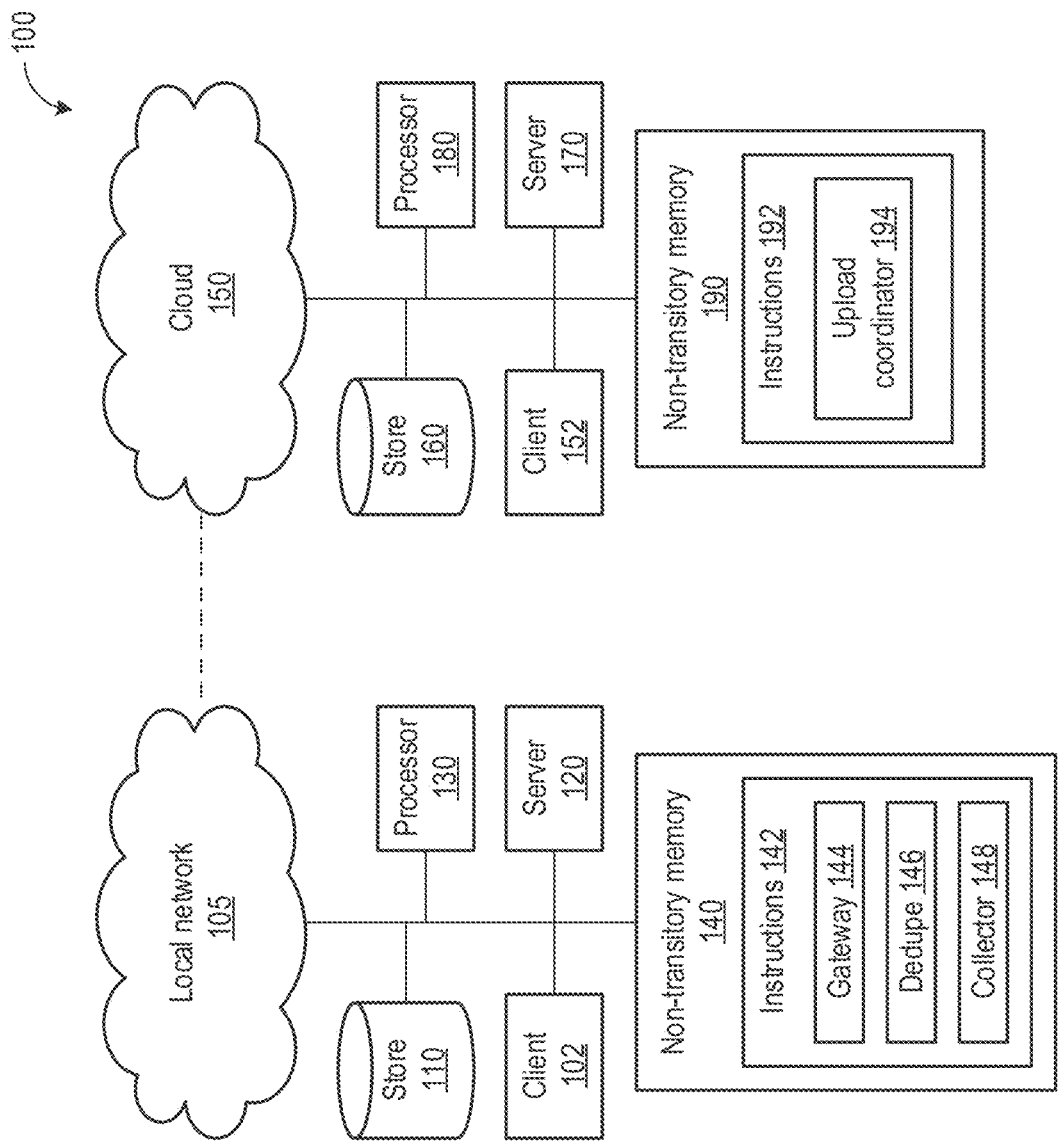
FIG. 1 schematically illustrates an example technical environment for the search and aggregation systems and methods disclosed herein.

FIG. 1 is schematically shows an exemplary system 100 which may be used for document search and aggregation in accordance with the present disclosure. The system 100 may include a local network 105 in which a corpus of documents may be contained, where one or more of those documents may be of potential interest. Local network 105 may be a local area network (LAN), wide area network (WAN), intranet, internet, Wi-Fi, cell phone network, or any other wired or wireless network for communication between computing devices. One of ordinary skill in the art would recognize that there are many possible variations on the number and interconnection of computing and storage devices in which all or part of the corpus of documents could be contained and searched according to embodiments. The corpus of documents stored in the local network 105 may include electronically stored information (ESI). Although local network 105 is described herein with respect to a limited number of devices and a single network, one of ordinary skill in the art will recognize that a system containing relevant documents may include different numbers of components and other types of components than those shown. In addition, the system components may be standalone or may be interconnected by one or more networks of various types.

Local network 105 includes computing devices, such as server 120, and client computer 102. Server 120 may comprise one or more servers and may be connected to one or more client computers 102. Server 120 may include processing and storage devices, which may contain the all or part of the corpus of documents of interest. Server 120 may be communicatively connected to other components in local network 105, e.g. by LAN, internet, Bluetooth, Wifi, or other appropriate connection. Local network 105 also includes client computer 102, which may comprise one or more client computers. Client computer 102 may include a processing device and storage media which may include all or part of the corpus of documents of interest. Client computer 102 may comprise a computer terminal intended for direct interaction with an operator, e.g. via monitor, keyboard, and other input/output devices. Client computer 102 may be connected to other devices in local network 105 and include connections to the Internet, Intranet, LAN, or others.

Local network 105 also includes storage device 110. Storage device 110 may comprise one or more computer-readable storage media, including but not limited to HDD, SDD, CD, DVD, or other transitory or non-transitory memory. The storage device may comprise a filesystem, email system, and/or other content repository containing ESI. The storage device may include all or some of the corpus of documents of interest. Local network 105 further includes one or more processing devices 130, which may be standalone devices or may be incorporated into one or more other devices in the network, such as the storage device 110, client 102, or server 120. The processing devices 130 may be configured to read and execute computer readable instructions embodying one or more aspect of the search and aggregations methods disclosed herein.

The local network 105 further comprises non-transitory memory 140. Non-transitory memory may form part of another component of local network 105, such as store 110, client 102, or server 120, or may be a stand-alone device. Non-transitory memory may comprise HDD, SDD, CD, DVD, or other appropriate physical medium. Non-transitory memory may include computer readable instructions 142, stored as computer code, for example. Instructions 142 may include specific instructions to carry out one or more of the functions or methods described herein. For example, this may include instructions for the gateway coordinator java virtual machine (JVM) 144, dedupe JVM 146, and collector JVM 148. The specific features of these functional blocks are described below with reference to the following figures.

Local network 105 may be communicatively coupled to a computing cloud 150, e.g. via Internet. Cloud 150 may comprise a distributed computing environment, e.g. with a large number of processors and storage media, including a high degree of computing parallelism and data redundancy. Cloud 150 may include elements similar to those in local network 105, such as data storage media 160, processing devices 180, client computes 152, servers 170, and non-transitory memory 190. Non-transitory memory may include instructions 192, comprising instructions to implement one or more aspects of the present disclosure. This may include instructions to carry out the functions of the upload coordinator JVM 194, described in more depth below. The cloud 150 may include a plurality of databases, e.g. in data store 160, such as HDFS, S3, Cassandra, and Redis databases, discussed below. Thus system 100 may provide an environment for one or more of the systems or methods described below. For example, the system described with respect to FIG. 2, or the methods described with respect to FIGS. 3 and 4 may be embodied in system 100. The system may, in general terms, be useful for executing a search for documents on the local network, performing the search locally, and aggregating the documents in the cloud, where the search is performed in such a way as to greatly reduce the bandwidth requirements for transferring the files from the local network to the cloud, and greatly reduce the storage requirements for the documents in the cloud. These goals are achieved by the systems and methods discussed below.

Figure 2:
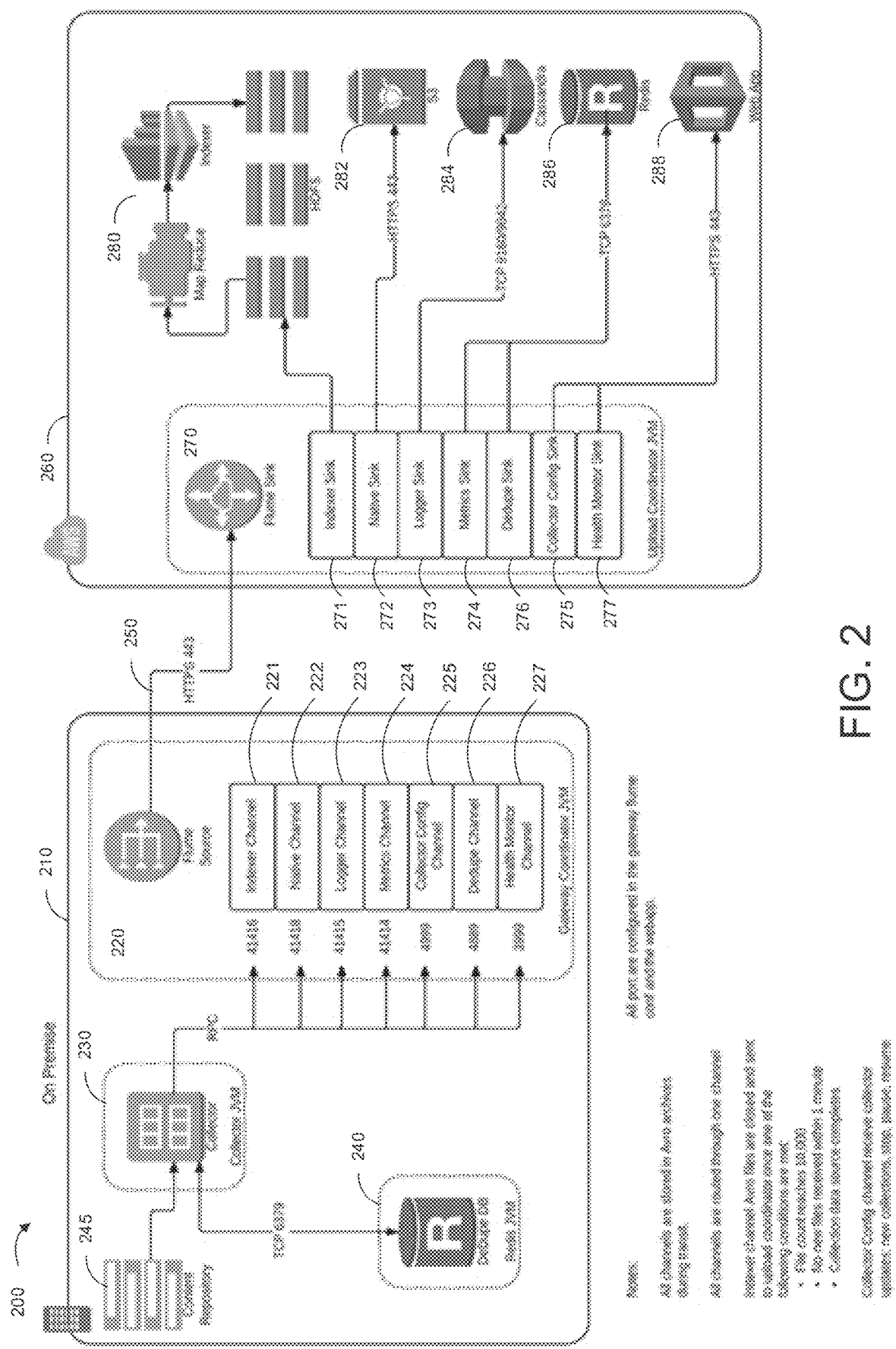
FIG. 2 schematically illustrates functional blocks of the gateway coordinator and upload coordinator systems.

Turning now to FIG. 2, an example embodiment is depicted which shows a system for carrying out the search and aggregation disclosed herein. System 200 includes a local system 210, which may comprise local network 105 in some examples, and a cloud computing service 260, which may comprise cloud 150 in some examples. The local system 210 and the cloud 260 may be communicatively coupled via Internet, e.g. via secure one-way HTTPS port 443, represented by reference number 250. In this embodiment, communication on port 250 is always one-way, from local system 210 to cloud 260, to improve the security of the system, and increase the confidence of the owners of local system 210. In other examples, communication on port 250 may be two-way communication.

Local system 210 includes content repository 245, which may comprise data store 110 or other appropriate storage device. Content repository 245 may include the corpus of documents which an operator is interested in searching. Local system 210 also includes Gateway Coordinator JVM 220, Collector JVM 230, and Dedupe JVM 240. These JVMs may comprise functional units instantiated as computer readable instructions in non-transitory memory, e.g. memory 140, and executed by a processor, e.g. processor 130. Gateway coordinator 220, Collector 230, and Dedupe 240 may be run continually while system 200 is active, and may operate in parallel with one another. Each of these components provides different functionality, detailed below.

Collector JVM 230 is a functional block which crawls, searches, aggregates, and forwards files to both Dedupe JVM 240 and Gateway Coordinator JVM 220. Collector 230 may receive one or more tasks or search requests from Collector config channel 225. Responsive to such a request, collector 230 connects to content repository 245 and crawls for files. Files encountered on the content repository may be copied into the collector 230 or referenced therefrom. These files may be subject to one or more search criteria, including keyword criteria, file name, type, date, extension, modify dates, or other appropriate search criteria. The files under consideration may also be passed to the dedupe JVM 240, to be deduplicated. A file which meets the search criteria and is deduplicated may then be passed from collector 230 to Gateway coordinator 220. Collector 230 may continue crawling, scanning, or searching files in content repository 245 until all available files have been scanned, or an appropriate stop condition is met, for example if the collector receives a stop command from collector config channel 225.

Collector JVM 230 may also be responsible for deNISTing the files discovered while crawling. DeNISTing, also known as "known file filtering," is a method to remove files of certain types which are known to have a very low likelihood of being relevant to a document search, especially in the case of an e-discovery search. DeNISTing automatically deletes, removes, or ignores files from the Reference Data Set provided by National Software Reference Library of the National Institute of Standards and Technology ("NIST"). These include known system files, and certain file types which have low relevance (e.g., .exe or .dll files).

Dedupe JVM 240 is a functional block which deduplicates files encountered in content repository 245. Dedupe JVM 240 may include a Dedupe database, wherein Dedupe JVM stores information indicative of files which have already been encountered. Thus, when collector 230 passes a file to Dedupe JVM 240 for deduplication, Dedupe JVM 240 may store some information associated with that file to the database to indicate that said file has been encountered. In one example this may comprise storing the entire physical file, however in some cases this may be prohibitively expensive in terms of processing power and/or storage space. Thus, the Dedupe JVM may instead opt to store one or more pieces of metadata relating to the file, and/or one or more cryptographic hashes determined from the file content. Thus, when the Dedupe JVM encounters a new file, it may then simply compare the metadata and/or cryptographic hashes to determine if the file has been encountered before. If the file has been previously encountered, Dedupe JVM may communicate to collector 230 that the file should be ignored or deleted. If the file has not been encountered before, Dedupe JVM 240 will record the metadata, hashes, and/or complete physical file for future comparisons, and indicate to collector 230 that it should proceed.

By performing search criteria matching, deNISTing, and deduplication all on local system 210, the number of documents which must be sent to cloud 260 may be greatly reduced. This coordinated processing occurring on a local computing network reduces data redundancy and eliminates irrelevant data before it is sent to the cloud, thereby greatly reducing bandwidth demands on communicative coupling 250. Reduced bandwidth demand may result in lower bandwidth charges, as well as improved performance for other devices on the network. Further, by reducing the amount of data before it is sent to the cloud, the amount of cloud storage required may be reduced, again reducing costs and the amount of labor required to manually review the documents aggregated with system 200 may also be reduced.

Gateway coordinator JVM 220 is a functional block which contains a plurality of processing channels operating in parallel, including Indexer channel 221, Native channel 222, Logger channel 223, Metrics channel 224, Collector config channel 225, Dedupe channel 226, and Health monitor channel 227. Gateway coordinator 220 receives data from collector 230, e.g. files which are determined to be of interest to a particular task and/or search query, and which have been deduplicated. Gateway coordinator 220 distributes these files, or appropriate portions thereof, to each of the aforementioned channels for processing. Each channel processes the data provided to it and produces an output, which the gateway coordinator manages and sends via port 250 to cloud service 260 and, in particular, to upload coordinator JVM 270 operating on cloud service 260. Communication on port 250 may use 256-bit public key encryption, for example.

Indexer channel 221, which comprises part of gateway coordinator 220, receives metadata of files from the collector 230, converts the metadata to Avro format, and sends the converted metadata to the upload coordinator 270. Metadata information may include the name, size, file type, file extension, file location, read and write dates, file creation and modification dates, user access, and other relevant metadata. File metadata may be converted to Avro format and sent to the Indexer sink 271 subprocess running in Upload coordinator JVM 270 in cloud 260.

Native channel 221 is responsive for taking native file content, converting the file content to Avro format and encrypting and compressing it. Native file content may comprise the content or physical file associated with a document. Native file content may be compressed using the Snappy open-source compression algorithm, or other appropriate method. Once the native file content is converted, compressed, and encrypted, it may be sent by gateway coordinator 220 to upload coordinator 270 running in cloud 260, where it is received by native sink 272.

Logger channel 223 is responsible for managing chain of custody data for each file. Chain of custody refers to a log describing the history of a document since a legal hold was issued. This may include specification of who was in possession of the document, where the document was physically located, any kind of manipulations performed on the document, such as file conversion, compression, or encryption, file deletion, copying, or transferal. Dates, times, and identities of operators may be stored for each corresponding action. Additionally, the search query used in the current search/crawl routine may be added to the chain of custody. The logger channel records this information in a file's chain of custody log or, if no such log exists, it may create one. The updated or newly created chain of custody information may then be sent by gateway coordinator 220 to upload coordinator 270 where it is received by logger sink 273.

Metrics channel 224 is responsible for tracking metrics relating to the search/task history of the gateway coordinator, collector, and dedupe systems. Metrics channel 224 may collect data or metadata as the search and aggregation task is being conducted and send the metrics data to metrics sink 274 in upload coordinator 270 running in cloud 260. Metrics recorded may include the number of files searched, the search terms used, amount of time searched, number of files recorded/transferred, number of files ignored/deleted, and so forth.

Collector config channel 225 pings the upload coordinator 270 on a regular or periodic schedule to determine if there are any tasks being requested. A task may comprise a search request, collection, ECA, or anything else that requires the gateway coordinator to trigger or become active. An exemplary task may be a search for certain documents on content repository 245. The search may be conducted based on keywords, which may be concatenated using logical operators such as AND, OR, NOT, or XOR. A search may also be constrained to search only for certain file types (document, spreadsheet, archive, etc.) or certain file extensions (.doc, .txt, .dll, etc.). A search may be defined for a particular range of dates for file creation, read/write, or modification, a range of file sizes, or a list of users who have read or written to the file. A search may be constrained to only access certain locations within content repository 245, e.g. only certain filesystems or subdirectories may be accessed. A keyword search may be configured to search for keywords in a file name and/or in file content. Other search terms or parameters may be employed without departing from the scope of this disclosure.

Collector config channel 225 communicates with upload coordinator 270, in particular collector config sink 275, to determine if a task has been requested. If collector config channel 225 encounters a task, it may relay the task to collector 230, where the search or other task is carried out. Otherwise, collector config channel 225 may remain idle until the next ping to determine if a task has been requested. Pings may occur at predetermined intervals, or in response to selected events such as power on events, task completion events, or other appropriate events.

Dedupe channel 226 is responsible for sending dedupe information from the local system 210 to the cloud 260, and for synchronizing dedupe information between the local system 210 and the cloud service 260. Dedupe channel 226 may receive dedupe information from the dedupe JVM 240. This information may include filenames, cryptographic hashes, or other relevant information indicative of files which have been deduped on the local system. This information may be collected, compressed, encrypted, and sent by dedupe channel 226 to dedupe sink 276 to aid in deduplication at the cloud service 260. Dedupe channel 226 may also receive dedupe information from the dedupe sink 276, which may then be passed on to dedupe JVM 240. By using the locally generate dedupe information in the cloud, as well as using the dedupe information received from the cloud locally, deduplication may be performed across multiple systems in a highly efficient manner. In this way, bandwidth and storage demands may be further reduced.

Health monitor channel 227 communicates with upload coordinator 270, in particular health monitor sink 277, to establish the system health of the gateway coordinator 220. Under normal circumstances, health monitor channel 227 may send a small packet of information regularly or periodically to communicate that everything is progressing normally. In the event that a problem is detected, health monitor channel 227 may stop sending health status packets, or may send status packets which indicate that there is a problem in the local system 210. Packets may include a trouble code or string to help diagnose the problem. Potential problems may include corrupted data in content repository 245, losing communication with one or more subsystems or subprocesses, unexpected data, excessive bandwidth use, internal system faults or errors, or other problems.

Each of these channels, in accordance with the above disclosure, may communicate some information about the files searched or the internal state of the gateway coordinator system. Communication may take place from the gateway coordinator 220, running on local system 210, to the upload coordinator 270, running in the cloud 260. Communication between the coordinators may be accomplished via secure Internet HTTPS port 443, indicated at 250. Communications may be compressed and encrypted, to decrease bandwidth use and increase security. Upload coordinator 270 has a plurality of subprocesses running in parallel, similar to those of the gateway coordinator, and these subprocesses, referred to herein as sinks, may correspond respectively to the channels in the gateway coordinator. The upload coordinator 270 may direct communications originating from a given channel to the appropriate corresponding sink, e.g. communications from Indexer channel 221 may be directed to Indexer sink 271, and so forth.

Indexer sink 271 receives communication from Indexer channel 221 via the upload coordinator. The data communicated may comprise metadata and or content relating to searched files, as described above. Metadata received by Indexer sink 271 may be decrypted and/or decompressed, and indexed and stored in Hadoop Distributed File System (HDFS) index sink 280.

Native sink 272 receives communication from Native channel 222. The data communicated may comprise native file content of searched files, as described above. Native file content received by Native sink 272 may be decrypted and/or decompressed and logged in S3 database 282.

Logger sink 273 receives communication from Logger channel 223. The data communicated may comprise chain of custody data, as described above. Chain of custody data may be decrypted and/or decompressed and logged in Cassandra database 284.

Metrics sink 274 receives communication from Metrics channel 274. The data communicated may comprise metrics data, as described above. Metrics data may be decrypted and/or decompressed and logged in Redis database 286.

Dedupe sink 276 receives dedupe information from dedupe channel 226. The dedupe information may then be written as an md5 hash into redis database 286. Dedupe data collected at the cloud service in this way may then be later used to deduplicated files received from local system 210, of from a plurality of such systems remote from the cloud and from one another. Further, this deduplication information may in some instances be passed or synchronized with dedupe channels on local systems, allowing local deduplication across multiple networks, even when those networks are not in communication with one another directly. This may greatly reduce bandwidth demands on communicative coupling 250, for example.

Collector config sink 275 may be in communication with collector config channel 225 and web app 288. Collector config sink 275 may receive information relating to a potential task request or search query from web app 288. For example, a task request may be input by an operator at a computer terminal into a graphical user interface (GUI) frontend of web app 288. This search request may then be transmitted to collector config sink 275. The task request may be stored in collector config sink at least until collector config channel 225 pings the sink to determine if there is a task request present. Once collector config channel 225 detects and receives the task request, the task request may be deleted from collector config sink 275 or, alternatively, the task request data may be maintained in the collector config sink until the task has been completed, at which point it may be deleted.

Health monitor sink 277 is in communication with health monitor channel 227 and web app 288. Health monitor sink 277 may receive periodic pings or health status packets from health monitor channel 227. The health monitor sink may then relay these packets, or the content thereof, to web app 288. If the health monitor sink does not receive a health status packet 277 when one is expected, e.g. within a predetermined time period, health monitor sink 277 may assume that there is a problem until a further status packet is received. If health monitor sink determines that there is a problem, such as one of those discussed above, it will communicate this fact to web app 288. Web app 288 may display health status to an operator using the program at a computer terminal, e.g. in the GUI.

System 200 may be initiated by a task command entered by an operator via web app 288, for example. Upon receiving a task command, this may be communicated to gateway coordinator 220 via collector config sink 275 and collector config channel 225. A document search may be initiated, according to one or more of the methods discussed below. The document search may include searching content repository 245 for documents relevant to the task until one or more termination conditions is met. In an exemplary embodiment, the search may continue until all available files on content repository 245 have been scanned. However, other conditions may cause an early termination. For example, the search may terminate after a fixed number of files has been scanned, or after a fixed number of files has been transferred to the cloud (e.g. 10,000 files). Other conditions which may prompt an early termination may include the health monitor channel outputting a signal indicative of an error; a loss of communication over port 250; one or more internal errors or losses of communication; a level of available bandwidth below a threshold; or other appropriate conditions.

Figure 3:
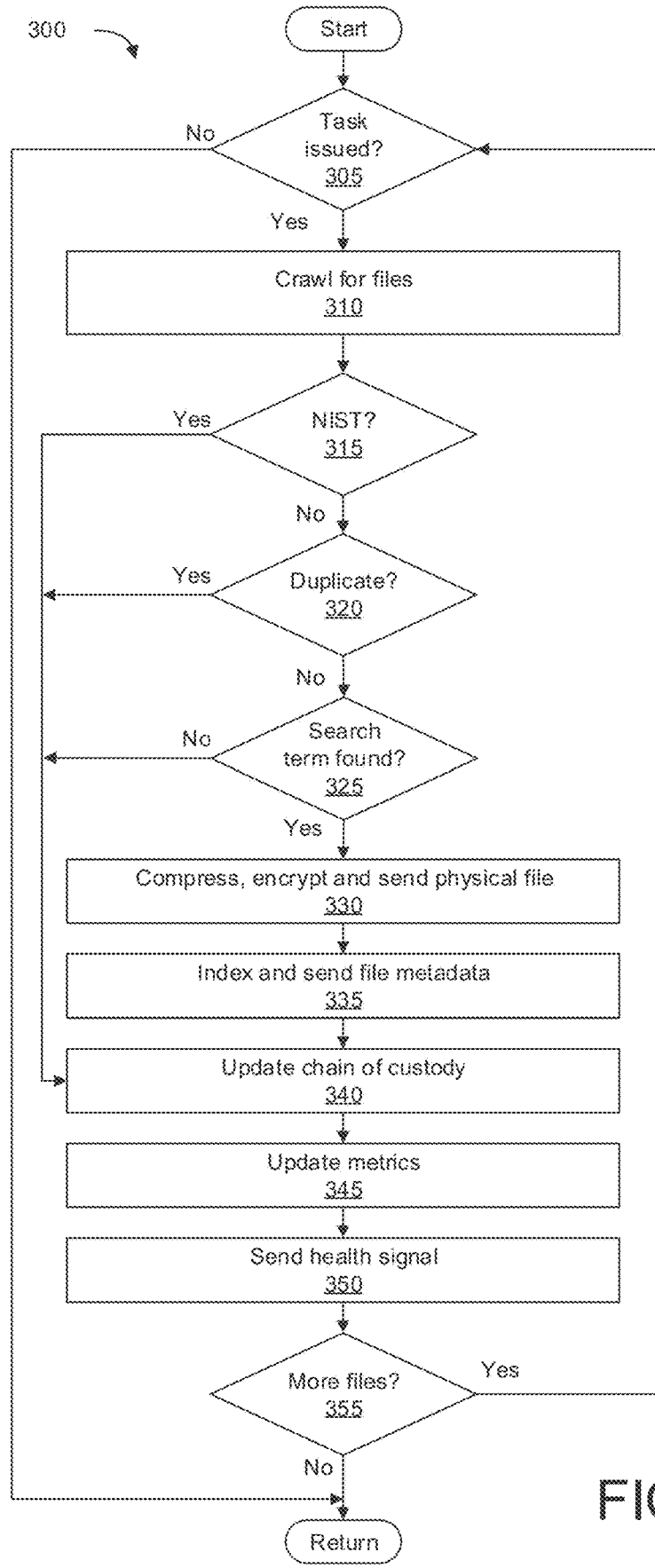
FIG. 3 shows a method for local content search, aggregation, and delivery.

An example method which may be used to carry out the functions of the Gateway Coordinator is illustrated in FIG. 3. Method 300 depicted therein may illustrate one or more of the aspects or processes of the gateway coordinator, dedupe, and collector functional blocks, described above, which may be run on a local filesystem to search for files, deduplicate, deNIST, and send them to the cloud, as well as processing metadata and analytics on said files. The method may be instantiated as computer-readable instructions stored in non-transitory memory, and run locally on a data source, such as a computer, server, network, or other appropriate data source which may comprise electronic storage media containing relevant documents. Method 300 is intended as a non-limiting example. Although the method is shown as a linearized, procedural sequence of processes or instructions, it is understood that this is not necessarily the case in all embodiments. Many of the individual process blocks may be run in parallel; in particular, when the method is instantiated as a system such as that in FIGS. 1 and/or 2, individual process blocks may be embodied as functional blocks operating on different channels, as described above. Still other implementations are possible without departing from the scope of this disclosure.

Method 300 begins at 305, where it is evaluated whether or not a task has been issued. A task can be an ECA, Collection, or anything that requires the Gateway Coordinator to trigger. For example, the Gateway Coordinator may receive a task requesting one or more document searches, such as a keyword search on a local database. Detecting and receiving the task request may be performed in by the collector config channel, in parallel to the other operations of the gateway coordinator. If a task has been issued and received, the method proceeds to 310; if a task is not received, the method returns.

At 310, the method includes crawling for files on the local data source. File crawling may be performed using an appropriate method, including depth-first and breadth-first searching methods, methods adapted to searching across multiple data sources, or simple brute force search routines. In one example, the crawling may be performed by the collector service, which runs on its own virtual machine. The files encountered may be passed to other JVMs or subsystems for further processing. Once the crawler encounters one or more files of potential interest, the method proceeds to 315.

At 315, the method performs automatic deNISTing. DeNISTing automatically discards file types which are known to be highly unlikely to contain relevant information. DeNISTing may be performed according to the National Software Reference Library Project maintained by the National Institute of Standards and Technology. Files known to be unlikely to be relevant to search criteria and/or e-discovery may include executable program files, linked library (.dll) files, system and help files, and so forth. Performing deNISTing automatically and locally helps to greatly reduce the amount of data which must be processed and thereby greatly reduces the amount of bandwidth required for transmission. Thus, at block 315, the method includes checking if the file in question is of a type indicated by the NIST list. If the file is determined to be of a file type which is unlikely to be relevant, the method may include ignoring or discarding the file, and proceeding to 340. If the file is not on the NIST list, the method proceeds to 320.

At 320, the method includes automatic local deduplication of files. The method checks if the file currently under examination is a duplicate of one or more other files in the file system (or network, server, distributed file system, etc.) in which the method is being run, e.g. by checking if the file has already been encountered. The automatic deduplication may be performed by a software process or subroutine running on its own JVM, in parallel to the other subroutines discussed herein. For example, the deduplication may be performed by the Dedupe JVM functional block, described above. Deduplication of files may be performed locally, by comparing the contents of the file under consideration to a log stored in a local dedupe database. The dedupe database may contain the entire contents of logged files, physical files, and/or metadata with which to compare new files to. The method may detect a duplicate file by comparing the entire contents of the file, or by another appropriate method. For example, the dedupe method may include computing one or more checksums or hashes of files to be compared, and/or comparing one or more pieces of file metadata. If the file under consideration is determined to be a duplicate file, it may be discarded or ignored and the method may proceed to 340. If the file under consideration is not a duplicate (and/or it is the first encountered instance of a given file), the method may proceed to 325. Further, if the file is not a duplicate file or is the first encountered instance of a file, the method may include storing data locally and/or sending data to the cloud which is representative of the file. This data may include filenames, metadata, cryptographic hashes, or other relevant data. This data may then be used in the future to identify potential duplicates either locally or non-locally.

In another embodiment, the method may include computing multiple hashes for each file under consideration, where each hash corresponds to a portion of the document. In this way, the automatic dedupe process may compare one or more portions of individual documents to one another, to determine if there are differences between the documents. This may be especially advantageous for large documents, wherein there may be slight changes or revisions between versions. Sending a copy of each slightly different document may result in a large proliferation of data, especially where documents are large, and the size of the local network/filesystem is large. However, by using a hashing technique wherein cryptographic hashes are computed for subsections or portions of documents, the method may discard or ignore the redundant parts of near-duplicate documents, and only send relevant, non-duplicate portions of said documents, where a copy of the larger document has already been encountered. In this embodiment, method 100 may treat each subsection of a document as its own document; thus, when the duplicate subsections are under consideration by the method, processing may proceed to 340, whereas when a non-duplicate subsection of the document is under consideration by the method, processing may proceed to 325.

At 325, the method includes checking whether the file under consideration meets the search criteria of the current task. This evaluation may be performed by the collector subprocesses discussed above/below, which may be running on the collector JVM on the local system. Search criteria may specify one or more relevant criteria of interest of the files being searched. For example, the search criteria may one or more keywords; the keywords may be concatenated or joined via one or more logical operators, including AND, OR, NOT, and XOR. Search terms may be enclosed in quotation marks to indicate that the verbatim phrase should be searched. The search criteria may include one or more properties of the files or file metadata, including file type (text document, spreadsheet, executable, hypertext, etc.) or file extension (.exe, .dll, .txt, .doc, etc.). Files may be searched according to the date the file was created, last modified, copied, or moved. Files may be searched according to location within the local server, network, or filesystem, such as within a given electronic data storage facility, within a given file subdirectory, or within a given network. Files may be searched according to size, including file size and/or document length (e.g. a number of pages or characters). Files may be searched according to filename, file content, or both. An operator may indicate that a certain number of search criteria must be satisfied in order for the file to be deemed relevant, e.g. the operator may elect that at least half of the criteria must be met. In other examples, all search criteria must be met. Still other examples of search criteria are possible without departing from the scope of this disclosure. If the method determines that the search criteria are met, processing proceeds to 330. If the search criteria are not met, processing proceeds to 340.

At 330, method 300 includes compressing, encrypting, and sending the physical file to the cloud. These processes may be performed by the Native channel subprocess, discussed above, and may be run in parallel to the other processing routines in method 300. The physical file under consideration may first be compressed by the native channel according to an appropriate compression algorithm. In an exemplary embodiment, the open source Snappy compression/decompression algorithm may be used, however other compression algorithms may be employed without departing from the scope of this disclosure. In particular, lossless data compression algorithms may be selected appropriate to the type of data being compressed.

Once the file under consideration has been compressed, the method then encrypts the data with an appropriate technique. This may include, for example, public-key encryption e.g. with a 256-bit encryption key, however another appropriate encryption method may be employed. Additionally or alternatively, at 330 the method may include converting the file of interest to an Avro file for use with Apache's Hadoop database. This may occur before encryption and compression. Once the file has been compressed and encrypted, the file may be sent via Internet to a cloud service. The file may be sent via secure HTTPS port 443, and received in a sink process running in the cloud, discussed below. Once the file has been sent to the cloud facility, processing proceeds to 335.

At 335, the method indexes and sends metadata relating to the file under consideration. This action may be performed by the Indexer channel subroutine running in the gateway coordinator JVM. Indexing may include recording or copying metadata information, such as the name, size, file type, file extension, file location, read and write dates, file creation and modification dates, user access, and other relevant metadata. This metadata may be compressed and sent via internet to the cloud facility, again via port 443, where it may be stored. Processing then proceeds to 340.

At 340, the method includes updating the chain of custody of the file under consideration. This may be performed the Logger channel subroutine running on the gateway coordinator JVM, discussed elsewhere. Chain of custody data may include specification of who was in possession of the document, where the document was physically located, any kind of manipulations performed on the object, such as file conversion, compression, or encryption, file deletion, copying, or transferal. Dates, times, and identities of operators may be stored for each corresponding action. Additionally, the search query used in the current search/crawl routine may be added to the chain of custody. The file's chain of custody is updated with this information and is sent via Internet to the cloud facility for storage. Once the chain of custody for the file under consideration has been updated, method 300 proceeds to 345.

At 345, the method includes updating and sending metrics. This may be performed by the Metrics channel discussed above, and may be performed in parallel with the other operations in this method. Metrics recorded may include the number of files searched, the search terms used, amount of time searched, number of files recorded/transferred, number of files ignored/deleted, and so forth. Once the metrics have been updated, the method sends the updated metrics to the cloud via HTTPS port 443. Method 300 then proceeds to 350.

At 350, the method includes sending a system health signal. This may be accomplished by the Health Monitor channel, and may be performed in parallel with the other operations described herein. The system health signal may comprise a packet which indicates to the cloud service (e.g. the upload coordinator) what the status of the local system (e.g. gateway coordinator, etc.) is, as discussed above. Once the system health signal is sent, the method proceeds to 355.

At 355, the method evaluates whether there are remaining files on the filesystem of interest. If there are remaining files to scan, the method proceeds to 305. If there are no remaining files (e.g., the method has crawled through all available files already), the method returns. Additionally, method 300 may return if an alternative stop condition is met.

Figure 4:
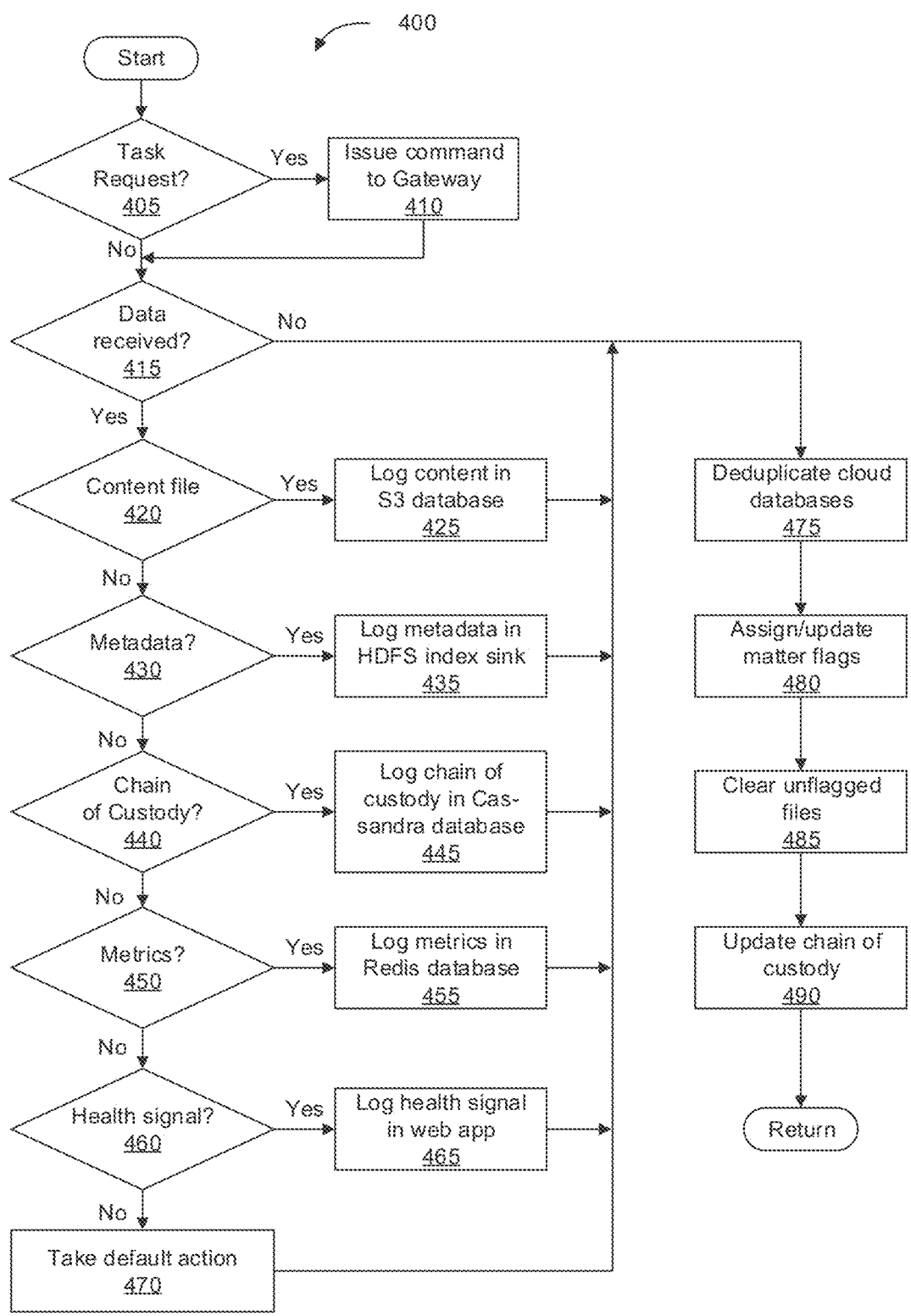
FIG. 4 shows a method for receiving query results in the cloud, and coordinating results across multiple matters and filesystems.

Turning now to FIG. 4, it depicts an exemplary method which illustrates many of the aspects of the search and aggregation routines described herein. In particular, method 400 may describe functions which are performed in the cloud, e.g. by cloud-based processing and storage devices. The previously described gateway coordinator and associated functions may be run locally on a filesystem containing a corpus of documents of potential interest, and may include sending a subset of these documents and associated data to the cloud facility. The present invention not only stores the data in the cloud as it received, however; an advantageous aspect of the present systems and methods is that parallel channel processing, deduplication, and coordinating between multiple matters is performed locally as well as in the cloud. In this way, not only are bandwidth usage and charges greatly reduced, as discussed above, but cloud storage and processing power requirements may also be greatly reduced, thereby further reducing costs.

Method 400 begins at 405, wherein it is evaluated if there is a pending task request. A task request may comprise a search query, such as those discussed above, entered by an operator into a graphical user interface, e.g. in a web app interface. The task request may be transferred via internet to the upload coordinator JVM running in the cloud. If a task request is found, processing proceeds to 410, otherwise processing proceeds to 415.

At 410, the method includes sending a task command to the gateway coordinator. This may include sending a packet of information via internet to the collector config channel, where it is received. The collector config channel may then take appropriate action with the task request, as described above. Once the task command is sent to the gateway coordinator, processing proceeds to 415.

At 415, the method checks to see if data is received, e.g. from one or more of the channels in the gateway coordinator. Data may comprise documents, metadata, metrics, etc. If data is received, processing proceeds to 420, otherwise processing proceeds to 475.

At 420, the method checks if the incoming data is a content file. This may comprise a compressed and encrypted file generated and sent by the Native channel. Content files may be in Avro format or other appropriate format. If the incoming data is a content file, processing proceeds to 425, where the content file is decompressed, decrypted, and logged in the S3 database. Processing then proceeds to 475. If the data is not a content file, processing proceeds to 430.

At 430, the method checks if the incoming data is comprises metadata. This may be metadata generated by the Indexer channel in the gateway coordinator JVM. Metadata may be in Avro format or other appropriate format. If the incoming data is metadata, processing proceeds to 435, where the metadata is decompressed, decrypted, and logged in the HDFS index sink. Processing then proceeds to 475. If the data is not metadata, processing proceeds to 430.

At 440, the method checks if the incoming data is chain of custody data. This may comprise chain of custody data generated and sent by the Logger channel in the gateway coordinator JVM. If the incoming data is chain of custody data, processing proceeds to 445, where the chain of custody data is decompressed, decrypted, and logged in the Cassandra database in the cloud. Processing then proceeds to 475. If the data is not chain of custody data, processing proceeds to 450.

At 450, the method checks if the incoming data is metrics data. This may comprise metrics data generated and sent by the Metrics channel in the gateway coordinator JVM. If the incoming data is metrics data, processing proceeds to 455, where the metrics data is decompressed, decrypted, and logged in the Redis database. Processing then proceeds to 475. If the data is not metrics data, processing proceeds to 460.

At 460, the method checks if the incoming data is a system health signal. This may comprise a system health signal generated and sent by the Health Monitor channel in the Gateway coordinator JVM. If the incoming data is a system health signal, processing proceeds to 465, where the system health signal is decompressed, decrypted, and logged in a corresponding web app. Processing then proceeds to 475. If the data is not a system health signal, processing proceeds to 470.

If the incoming data is not a content file, metadata, chain of custody, metrics, or health signal, at 470 the method 400 includes taking a default action with the incoming data. In one example, the method may ignore or delete the incoming data. In another example, the method may include storing the data in a cloud database or other storage device. In yet another example, the method may include generating an error message based on unexpected data received. Once default action is complete, processing proceeds to 475.

At 475, the method includes deduplicating cloud databases. In one example, cloud database deduplication may be performed each time a new file is received by comparing the incoming file to files already in cloud databases. An incoming file which matches one or more existing files in the cloud databases may be ignored or deleted. Additionally or alternatively, cloud deduplication may be performed periodically, e.g. every predetermined period. In this case, the cloud service may compare existing files to one another according to an appropriate method, and delete duplicate files. In this way, the cloud service is able to reduce storage demand (and therefore costs), as well as reducing the amount of documentation which must be manually reviewed. This is especially advantageous when searches (e.g. e-discovery) are performed across multiple filesystems which may not be communicatively coupled to each other. This may also be advantageous for coordinating files across multiple tasks or matters, discussed in more depth below. Once cloud databases are deduplicated, processing proceeds to 480.

At 480, the method includes assigning and/or updating matter flags. Files stored in the cloud databases may be assigned one or more matter flags. A matter flag may be a small packet of data attached to a file's metadata which indicates which matter(s) or task(s) a file is relevant to. Using the example of e-discovery, there may be multiple legal proceedings (e.g. multiple cases) active at one time. By assigning each file in the database a flag, the system may keep track of which case each file is relevant to. This also allows the system to keep only one copy of each file, even though the file may be relevant to more than one case. Thus, upon saving a new file to the cloud database, it may be assigned one or more flags (e.g. as input by an operator upon issuing a task command). Block 480 may also include checking the status of the matters or tasks under consideration, and updating flags accordingly. If the status of a matter has changed—e.g. a matter has been finished, deleted, or indicated as inactive—the system may update the flags accordingly—e.g. by deleting the corresponding matter flags from all files in the database. Processing then proceeds to 485.

At 485, the method includes checking existing files in the database to see if there are files remaining which have no flags. A file with no matter flags may indicate that the file is no longer relevant to any of the currently active matters. In this case, the method may delete the files and any associated metadata, to minimize storage demands. Processing then proceeds to 490.

At 490, the method includes updating the chain of custody for files which have been modified or affected. This may include updating the chain of custody to reflect that one or more files have been deleted by the cloud deduplication routine, or because the files were no longer flagged as relevant to one or more matters. Once the chain of custody have been updated, the method returns.

Method 400 may run continually while the gateway coordinator is actively scanning. Alternatively, the method 400 may run continually in the cloud, regardless of the status of the gateway coordinator, or method 400 may only trigger when one or more files are received in the cloud from the gateway coordinator. Although the individual functional blocks in method 400 are shown sequentially, it is understood that these functions may be run in parallel with one another. In particular, when the system architecture shown in FIG. 2 is used to run the method 400, substantially all of the functional blocks in FIG. 4 may be executed simultaneously, e.g. by one or more of the sinks.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
via a gateway coordinator of a local system,
receiving a task comprising search criteria;
crawling for files on a local data source of the local system, and encountering one or more files of interest;
deNISTing and deduplicating the one or more files of interest on the local system, wherein the deNISTing automatically deletes, removes, or ignores files from a National Software Reference Library of a National Institute of Standards and Technology Reference Data Set; and
sending the deNISTed and deduplicated one or more files of interest to an upload coordinator of a remote cloud facility,
wherein the one or more files of interest are deNISTed prior to being deduplicated, and wherein the gateway coordinator is a virtual machine.

2. The method of claim 1, further comprising checking whether each of the one or more deNISTed and deduplicated files of interest meet the search criteria prior to sending the deNISTed and deduplicated one or more files of interest to the upload coordinator of the remote cloud facility, wherein the upload coordinator is a virtual machine.

3. The method of claim 1, wherein the task is received via a collector config channel of the gateway coordinator that pings the upload coordinator of the remote cloud facility periodically.

4. The method of claim 3, wherein the collector config channel relays the task to a collector of the local system, wherein the collector crawls for the files, and wherein the collector deNISTs and deduplicates the one or more files of interest.

5. The method of claim 1, further comprising sending a system health signal via the gateway coordinator from the local system to the upload coordinator of the remote cloud facility.

6. The method of claim 5, further comprising detecting a problem in the local system, and sending a status packet indicating the problem in the local system as the system health signal.

7. The method of claim 5, wherein the system health signal is sent via the gateway coordinator from the local system to the upload coordinator of the remote cloud facility periodically.

8. The method of claim 7, further comprising, not receiving the system health signal at the remote cloud facility within a predetermined time period, and determining that there is an error at the local system responsive to not receiving the system health signal at the remote cloud facility within the predetermined time period.

9. The method of claim 1, wherein the deduplicating includes computing multiple hashes for each of the deNISTed one or more files of interest, each hash corresponding to a portion of a corresponding file of interest, and comparing one or more portions of the deNISTed one or more files of interest to one another to determine if there are differences.

10. The method of claim 9, further comprising discarding or ignoring redundant parts of near-duplicate documents for the deduplicating, and wherein sending the deNISTed and deduplicated one or more files of interest includes only sending non-duplicate portions of the one or more files of interest to the remote cloud facility.

11. A method, comprising:
via a gateway coordinator of a local system,
receiving a task comprising search criteria;
crawling for files on a local data source of the local system and collecting one or more files of interest;
deNISTing the one or more files of interest at the local system, wherein the deNISTing automatically deletes, removes, or ignores files from a National Software Reference Library of a National Institute of Standards and Technology Reference Data Set; then
deduplicating the deNISTed one or more files of interest at the local system; and
sending the deNISTed and deduplicated one or more files of interest to a remote cloud facility, wherein the gateway coordinator is a virtual machine, wherein each of the one or more deNISTed and deduplicated files of interest are determined meet the search criteria prior to sending the deNISTed and deduplicated one or more files of interest to the remote cloud facility.

12. The method of claim 11, further comprising encrypting and compressing the deNISTed and deduplicated one or more files of interest before sending the deNISTed and deduplicated one or more files to an upload coordinator of the remote cloud facility.

13. The method of claim 11, further comprising sending a system health signal from the local system to the remote cloud facility, the system health signal indicating whether there is an error at the local system.

14. The method of claim 13, further comprising determining the local system has an error at the remote cloud facility, and displaying a health status at a computer terminal that is remote from the local system responsive to determining the local system has the error.

15. The method of claim 11, wherein communication is always one-way from the local system to the remote cloud facility.

16. A method, comprising:
via a gateway coordinator of a local system,
pinging a remote cloud facility until a task comprising search criteria is received;
crawling for files on a local data source of the local system and collecting one or more files of interest responsive to receiving the task comprising search criteria;
deNISTing the one or more files of interest at the local system;
deduplicating the deNISTed one or more files of interest at the local system;
sending the deNISTed and deduplicated one or more files of interest to an upload coordinator of a remote cloud facility, wherein the gateway coordinator and the upload coordinator are virtual machines,
wherein each of the one or more deNISTed and deduplicated files of interest are determined to meet the search criteria prior to sending the deNISTed and deduplicated one or more files of interest to the remote cloud facility, and wherein the deNISTing automatically deletes, removes, or ignores files from a National Software Reference Library of a National Institute of Standards and Technology Reference Data Set.

17. The method of claim 16, further comprising sending a system health status of the local system to the remote cloud facility, wherein the system health status indicates a health of the gateway coordinator of the local system, wherein the gateway coordinator contains a plurality of processing channels operating in parallel.

18. The method of claim 17, wherein the plurality of processing channels of the gateway coordinator include a collector config channel, wherein the collector config channel carries out the pinging of the remote cloud facility.

* * * * *